United States Patent [19]

Frye

[11] Patent Number: 4,564,161
[45] Date of Patent: Jan. 14, 1986

[54] HELICOPTER RESCUE BASKET

[76] Inventor: Sally Z. Frye, 1422 E. Blackburn Rd., Mount Vernon, Wash. 98273

[21] Appl. No.: 567,167

[22] Filed: Dec. 30, 1983

[51] Int. Cl.[4] ............................................. B63C 9/26
[52] U.S. Cl. ................................ 244/137 P; 182/150; 441/83; 294/81.1
[58] Field of Search ............ 244/137 A, 137 P, 136; 43/102, 6.5; 294/81 R, 81 SF; 441/80, 83; 182/142, 150

[56] References Cited

U.S. PATENT DOCUMENTS

| | | | |
|---|---|---|---|
| 1,750,878 | 3/1930 | Coe | 294/81 R |
| 2,738,939 | 3/1956 | Johnson | 441/83 |
| 2,969,210 | 1/1961 | Richardson et al. | 244/137 P |
| 3,343,189 | 9/1967 | Pollard et al. | 441/83 |
| 3,421,165 | 1/1969 | Pugh | 441/83 |
| 3,428,276 | 2/1969 | Hubbard | 244/136 |
| 4,099,689 | 7/1978 | Sterner et al. | 244/136 |

Primary Examiner—Trygve M. Blix
Assistant Examiner—Rodney Corl
Attorney, Agent, or Firm—Harvey B. Jacobson

[57] ABSTRACT

A rescue basket structure to be suspended from a helicopter winch cable comprises a cruciform-like suspension frame and a collapsible rectangular basket-like container suspended by cables from the frame. The suspension frame has tail fins to stabilize the structure when it is airborne and the cable configuration is designed to impart a scooping action to the container when it is lowered into water to facilitate access thereto by a person being rescued or an object being recovered. The basket-like container may also be partially covered over its base and may trail a sea anchor to enhance the scooping action.

15 Claims, 7 Drawing Figures

HELICOPTER RESCUE BASKET

BACKGROUND OF THE INVENTION

This invention relates to rescue and retrieval equipment. It is an object of the invention to provide a collapsible, lightweight, basket-type container structure suitable for lifting people, bodies, or other objects, for example, by helicopter, from water, tall buildings, cliffs or other locations where access is difficult.

STATEMENT OF PRIOR ART

The following U.S. patents relate to rescue equipment and the like, however none of these discloses the features of the present invention.
U.S. Pat. No. 2,557,079
U.S. Pat. No. 2,817,860
U.S. Pat. No. 3,036,315
U.S. Pat. No. 3,228,044
U.S. Pat. No. 3,887,953
U.S. Pat. No. 4,138,077
U.S. Pat. No. 4,188,000

SUMMARY OF THE INVENTION

A basket-type container structure in accordance with the invention, for the purposes indicated, comprises a sturdy, lightweight suspension frame of aluminum or the like, the frame being of cruciform shape, and a basket-like container suspended by cables from the frame. The frame may comprise a longitudinal member, a substantially centrally located crossbar, attachment means for a helicopter winch cable or the like at the junction of the longitudinal member and central crossbar, and a further crossbar adjacent a forward end of the frame. The container may comprise upper and lower tubular rim members of substantially rectangular shape, with collapsible webbing forming the basket base and sides. The upper rim may conform in length and breadth substantially to the length and breadth of the suspension frame. Suspension cables may extend from opposite ends of the forward crossbar to the sides of the upper basket rim adjacent the front corners thereof, from opposite ends of the central crossbar to central portions of the sides of the upper rim, and from the rear end of the longitudinal frame member centrally to the end portion of the upper rim. The rear end of the longitudinal frame member may have a rudder and fin assembly for stabilizing the structure when it is airborne, particularly in windy conditions. The rear part of the basket base may be covered in sheet material, e.g. canvas, and a trailing tubular, sock-like sea anchor may be attached at the rear end of the container.

The container structure in accordance with the invention is light in weight, easily collapsible so that it may be carried by one person, and effective in operation. The provision of the fin and rudder assembly stabilizes the structure when it is airborne, and the configuration of the suspension cables along with the provision of the covering sheet on the rear of the basket base and the sea anchor imparts a scooping action to the container when it is lowered into water, to facilitate access for persons being rescued. Access is further facilitated at the forward end of the structure by the spacing of the front end suspension cables at the ends of the front crossbar.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF PREFERRED EMBODIMENTS

As shown more particularly in FIGS. 3 to 7 of the accompanying drawings, a collapsible rescue basket structure 10 for use suspended from a helicopter and the like comprises a suspension frame 12, and a basket-type container 14 suspended from the frame by cables 16, 18, 20, 22, 24.

Figure 1:
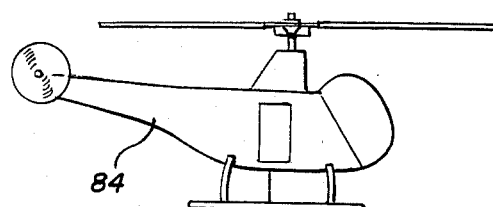
FIG. 1 is an elevational view of a rescue basket structure in accordance with the invention suspended from a helicopter while being carried to a rescue assignment.

Suspension frame 12, which may be of welded aluminum or like light-weight metal is of cruciform shape comprising a longitudinal box-section frame member 26, a substantially centrally located crossbar assembly 28, and a front end crossbar assembly 30. The central crossbar assembly may comprise left and right beam members 32, 34, left and right cable attachment plates 36, 38, a central attachment plate 40 for a pivotal eyebolt 42, attachment plate support webs 44, 46, and bracing elements 48. The front end crossbar assembly may comprise left and right beam members 50, 52, cable attachment plates 54, 56, and attachment plate support webs 58, 60. The rear end of longitudinal frame member 26 may be equipped with horizontal stabilizer fins 62, 64, a vertical stabilizer fin 66, together defining a rudder and tail plane-type assembly, and a cable attachment plate 68 (see FIGS. 1 and 2). The overall length of member 26 may typically be about 6 feet 3 inches, the length of crossbar assembly 28 about 3 feet 3 inches, and the length of crossbar assembly 30 about 2 feet 3 inches.

The basket-type container 14 may comprise an upper rectangular rim member 70 of lightweight metal tubing, a lower rectangular rim member 72 also of lightweight metal tubing or the like, but slightly smaller than upper rim member 70, strips 76 of interwoven Nylon or like webbing material attached to and connecting the upper and lower rim members, and further interwoven strips 78 of the webbing material connected between opposite sides and ends of the lower rim member to form a base for the container. Typically, upper rim member may conform in dimensions to the suspension frame having, for example, a length of about 6 feet 3 inches, and a width of about 3 feet 3 inches, while the lower rim member may, in this case, have a length of about 6 feet and a width of about 3 feet. The length of strips 76 may be about 2 feet. Additionally, a sheet of canvas or like material 79 may be secured across the base at the rear end of the basket, the sheet having a length of about 2 feet, and the basket may have a sock-type tubular sea anchor 80 attached by a suitable cord 81 to the back of the lower rim member 72.

Cables 16–24 may be of vinyl-covered steel having a length of about 2 feet 2 inches. Cables 16 and 18 may be connected between plates 54, 56 and the sides of upper rim member 70 near the front of the basket, so that the cables incline rearwardly, cables 20 and 22 may be connected between plates 36, 38 and the sides of upper rim member 70 substantially at the center of the basket, and cable 24 may be connected between plate 68 and the back of upper rim member 70 substantially centrally thereof.

Figure 2:
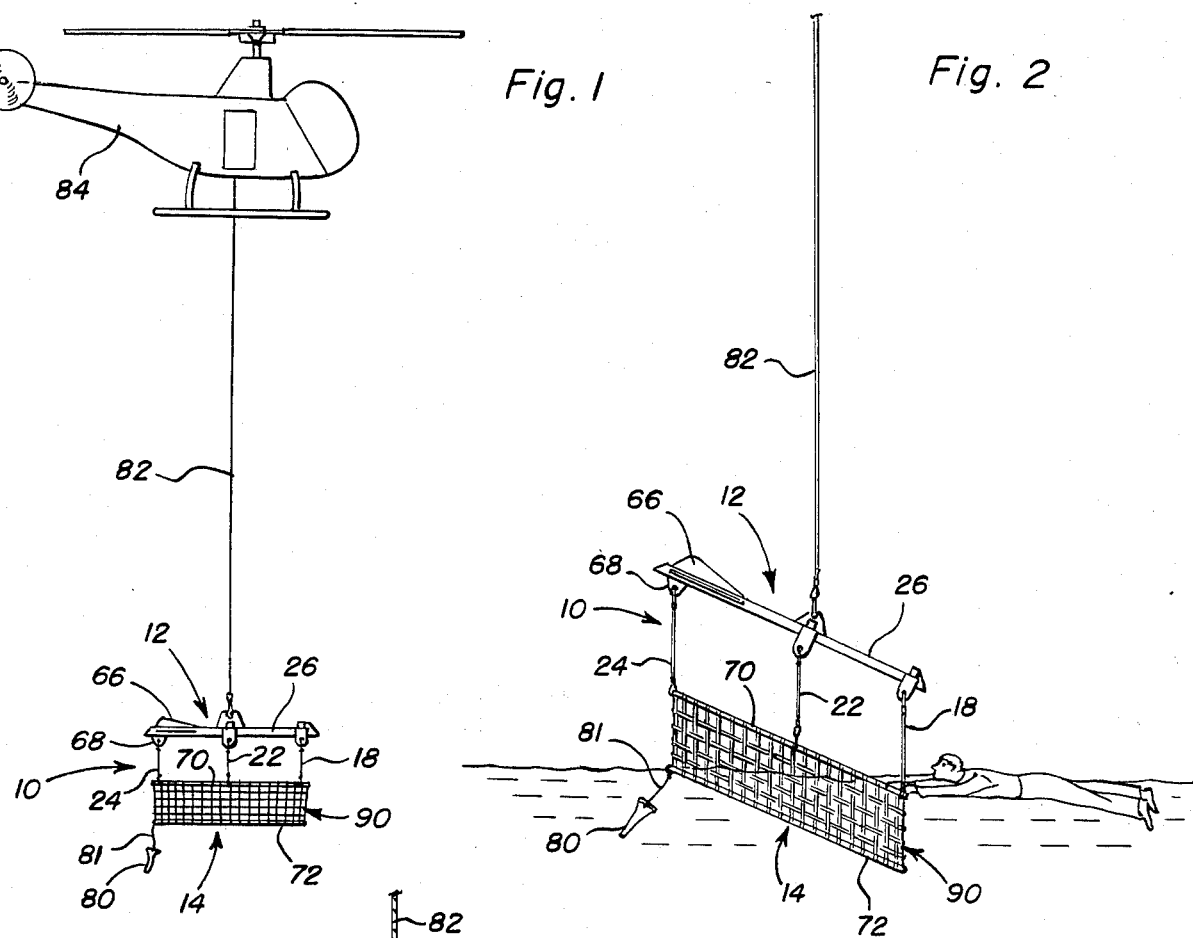
FIG. 2 is an elevational view of the structure, on an enlarged scale, after it has been lowered into water for rescue purposes.
Figure 3:
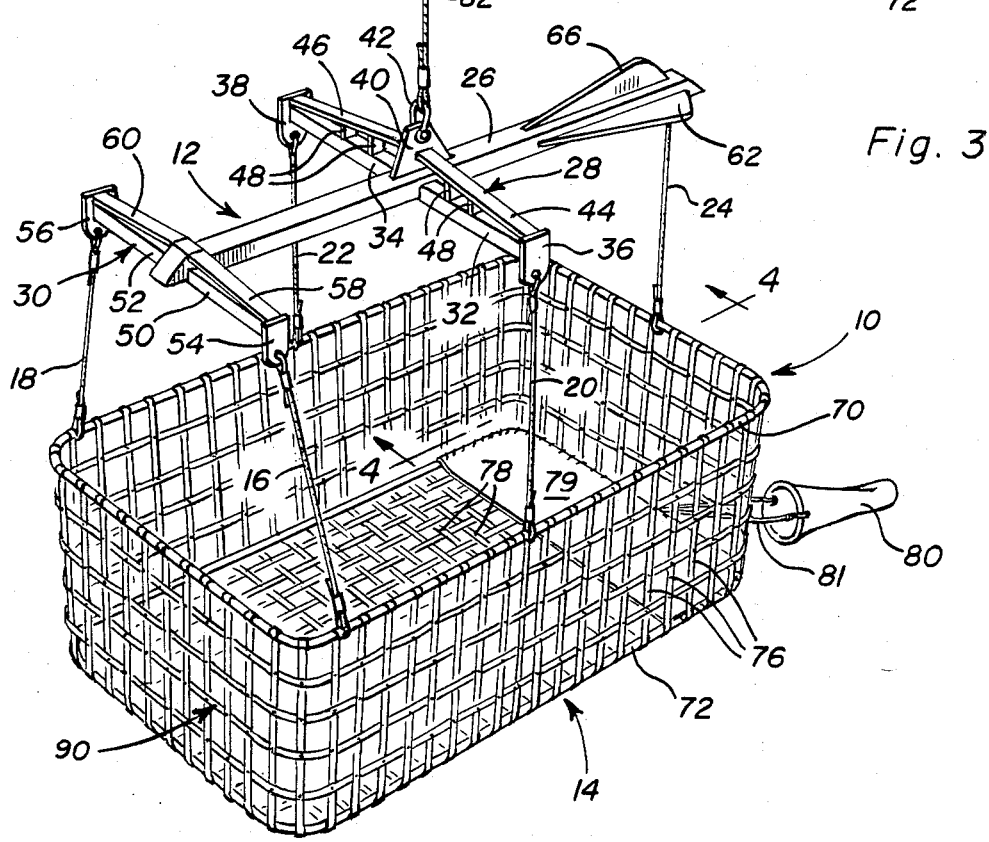
FIG. 3 is a perspective view of the basket structure on a further enlarged scale.
Figure 4:
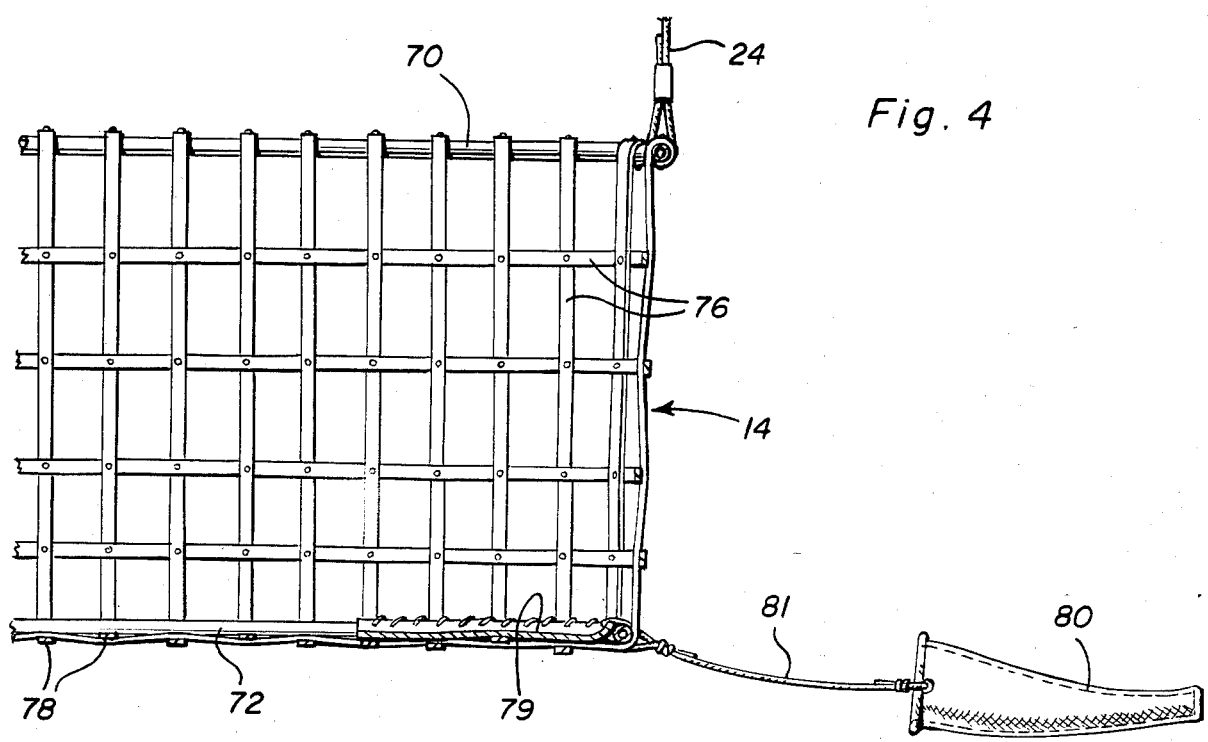
FIG. 4 is a sectional view on line 4—4 of FIG. 3 on a still further enlarged scale.
Figure 5:
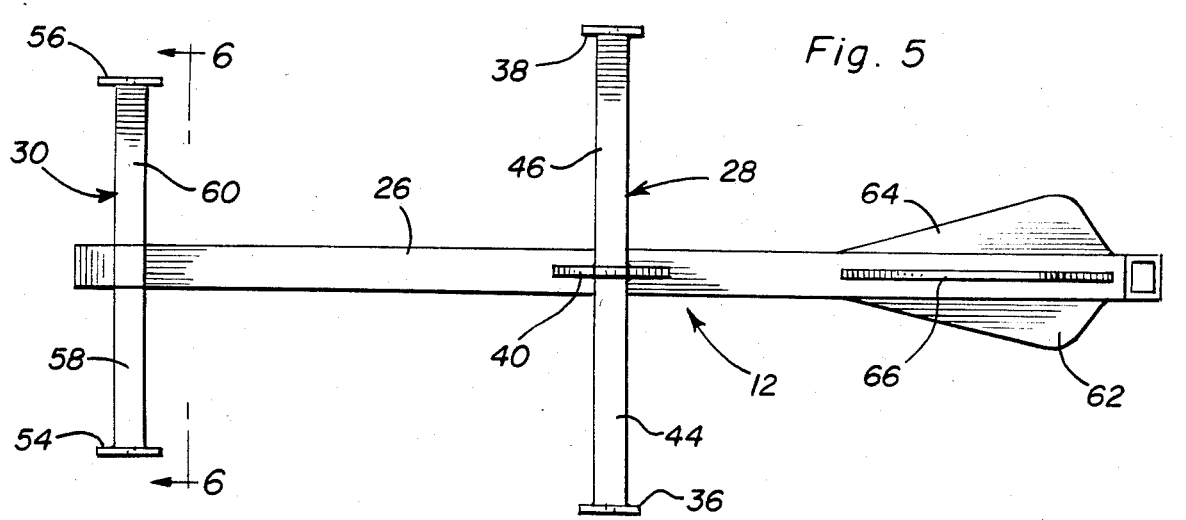
FIG. 5 is a plan view of a suspension frame portion of the basket structure.
Figure 7:
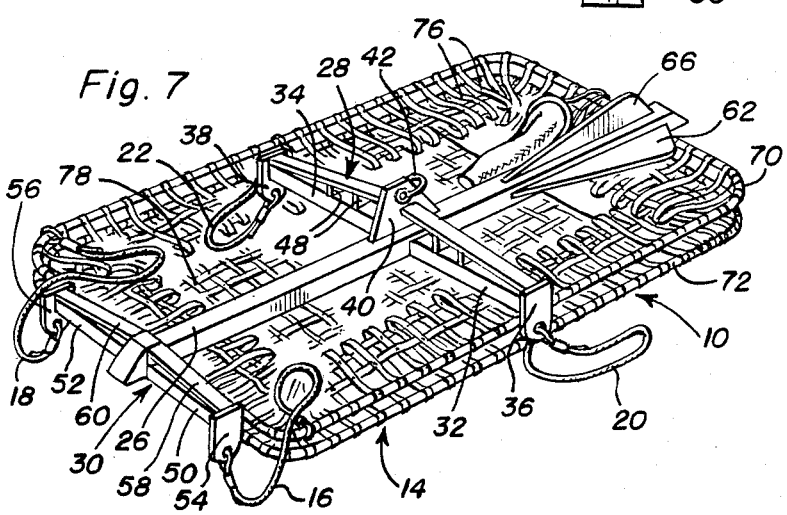
FIG. 7 is a perspective view of the basket structure in collapsed condition.
Figure 6:
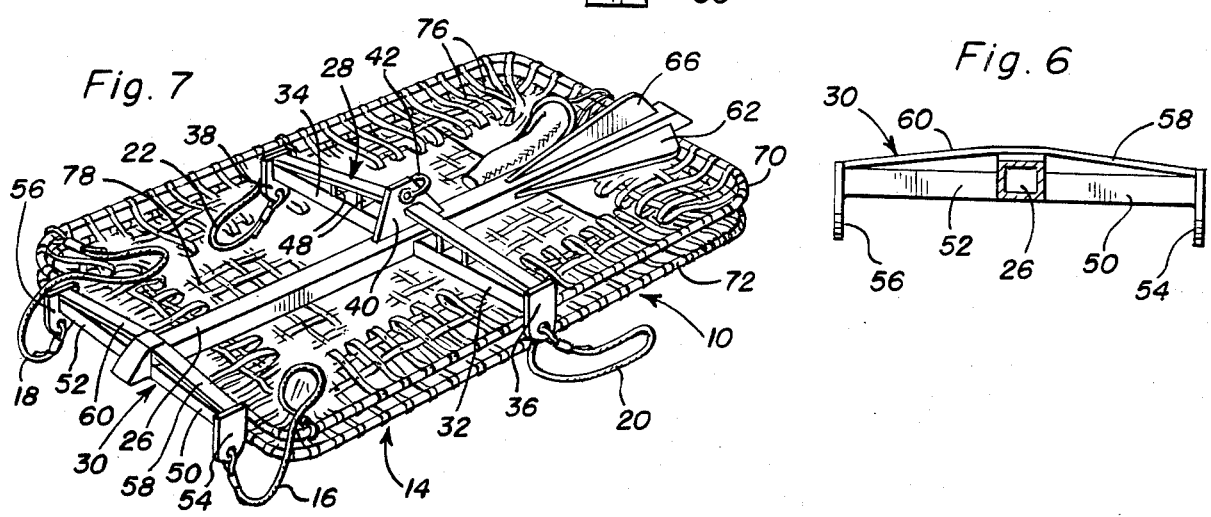
FIG. 6 is a sectional view on line 6—6 of FIG. 5.

The structure may be readily transported by one person when in the collapsed condition shown in FIG. 7. When it is necessary to use the structure for a rescue operation, it may be attached by eyebolt 42 to the free end of a winch cable 82 of a helicopter 84, for example, for suspension below the helicopter. When airborne, as in FIG. 1, the balance of the structure about eyebolt 42 is such as to promote level flight with wind stabilization being obtained by the rudder and tail plane assembly. However, when the structure is lowered into and moved through water, the configuration of the suspension frame 12 and the cable connections, along with the provision of base cover sheet 79 and sea anchor 80, imparts a scooping action to the basket with the front end 90 of the basket tipping downwardly as shown in FIG. 2, to facilitate entry to the basket for persons being rescued. Entry at the front end of the basket is also facilitated by the relatively wide opening bounded by the front crossbar assembly 30, cables 18, 20, and the front portion of upper rim member 70. The scooping action is particularly useful for recovery of inanimate objects or severely injured persons from the sea or other waters. When the structure is lifted from the water it reverts to its level, in-balance position.

While described above in relation to rescue from the sea or other waters, the structure is also useful for land-based rescue or recovery missions from inaccessible positions.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. Apparatus for suspension from a helicopter and the like for use in rescue and recovery operations, the apparatus comprising a suspension frme, means for attaching the frame to a helicopter winch cable and the like, means for suspending a basket-like container from the frame, and fin means or the frame for stabilizing the apparatus when airborne, wherein the suspension frame includes an elongate frame member, and a cross bar, the means suspending the container comprises cables connected at opposite ends of the elongate member and cross bar, the means for attaching the frame to a helicopter winch cable or the like is located substantially centrally of the elongate member, and the fin means is located at one end of the elongate member.

2. The invention of claim 1 wherein the fin means comprises a pair of horizontal fin members on opposite sides of the elongate member and a centrally located vertical fin member therebetween.

3. Apparatus for suspension from a helicopter and the like for use in rescue and recovery operations, the apparatus comprising a suspension frame, pivotal attachment means for attaching the frame to a helicopter winch cable or the like, a basket-like container, means suspending the container from the frame, and means for imparting a scooping action to the container facilitating access thereto for a person or object being rescued or recovered when the container is lowered into water, wherein the basket-like container comprises a rigid upper rim, with open basketwork walls and an open basketwork base depending from the rim, the means for imparting a scooping action to the basket including sheet material covering a portion of the base.

4. The invention of claim 3 wherein the container is of substantially rectangular form and the sheet material covers a portion of the base at one end thereof.

5. The invention of claim 3 wherein the means for imparting a scooping action further includes a sea anchor and means connecting the sea anchor to the container for trailing from said portion of the base covered by said sheet material.

6. Apparatus for suspension from a helicopter and the like for use in rescue and recovery operations, the apparatus comprising a suspension frame, means for attaching the suspension frame to a helicopter winch cable and the like, and a basket-like container suspended from the suspension frame, the frame comprising an elongate member and at least one crossbar extending laterally of the elongate member, the container having a rigid substantially rectangular upper rim with a length substantially conforming to the length of said elongate member and a width substantially conforming to the length of the crossbar, and the container being suspended from the frame by means including a pair of cables connected between opposite ends of the crossbar and side portions of the rim and a further cable connected between one end of the elongate member and a laterally extending portion of the rim substantially centrally thereof, the means for attachment the suspension frame to a helicopter winch cable and the like being located substantially centrally of the elongate member.

7. The invention of claim 6 wherein the suspension frame includes a crossbar at a forward end thereof with cables connected between opposite ends of the crossbar and side portions of said rim adjacent front corners thereof, and a further crossbar located substantially centrally of the elongate member with cables connected between opposite ends thereof and side portions of the rim.

8. The invention of claim 6 including fin means on the elongate member at said one end thereof for stabilizing the apparatus when airborne.

9. The invention of claim 8 wherein the fin means comprises opposed horizontal fins and a vertical fin therebetween.

10. The invention of claim 6 wherein the container further includes a rigid substantially rectangular lower rim of smaller dimensions than the upper rim, and collapsible open-work webbing connecting the rims to form side, front and rear walls for the container with further open-work webbing being associated with the lower rim to form a base for the container.

11. The invention of claim 10 wherein the base includes a covering of sheet material at one end thereof.

12. The invention of claim 11 including a sock-type sea anchor connected to the lower rim at said one end of the base.

13. Apparatus for suspension from a helicopter and the like for use in rescue and recovery operations, the apparatus comprising a suspension frame, pivotal attachment means for attaching the frame to a helicopter winch cable or the like, a basket-like container, means suspending the container from the frame, and means for imparting a scooping action to the container facilitating access thereto for a person or object being rescued or recovered when the container is lowered into water, wherein the basket-like container includes a rigid substantially rectangular upper rim having longitudinal side portions interconnected by lateral front and rear portions, the suspension frame includes an elongate member extending lengthwise of the rim, the pivotal attachment means is located substantially centrally of the elongate member, the means suspending the container comprises cables connected between the suspension frame and said upper rim, and the means for imparting s scooping action to the container comprising an arrangement of the cables including a air of inclined cables connected between a forward end of the elongate member and opposite side portions of the rim rearwardly of front corners thereof, and a cable connected between a rear end of the elongate member and the rear portion of the rim substantially centrally thereof.

14. The invention of claim 13 wherein the suspension frame has a central laterally extending crossbar and further cables connected between opposite ends of the central crossbar and the respective side portions of said upper rim.

15. The invention of claim 14 wherein the suspension frame includes a further laterally extending crossbar at the forward end thereof, and said inclined cables are connected at opposite ends of the further crossbar.

* * * * *